March 26, 1940.  G. E. SLAUGENHOP  2,195,344
TANK CLEANER
Filed Aug. 27, 1937  2 Sheets-Sheet 1
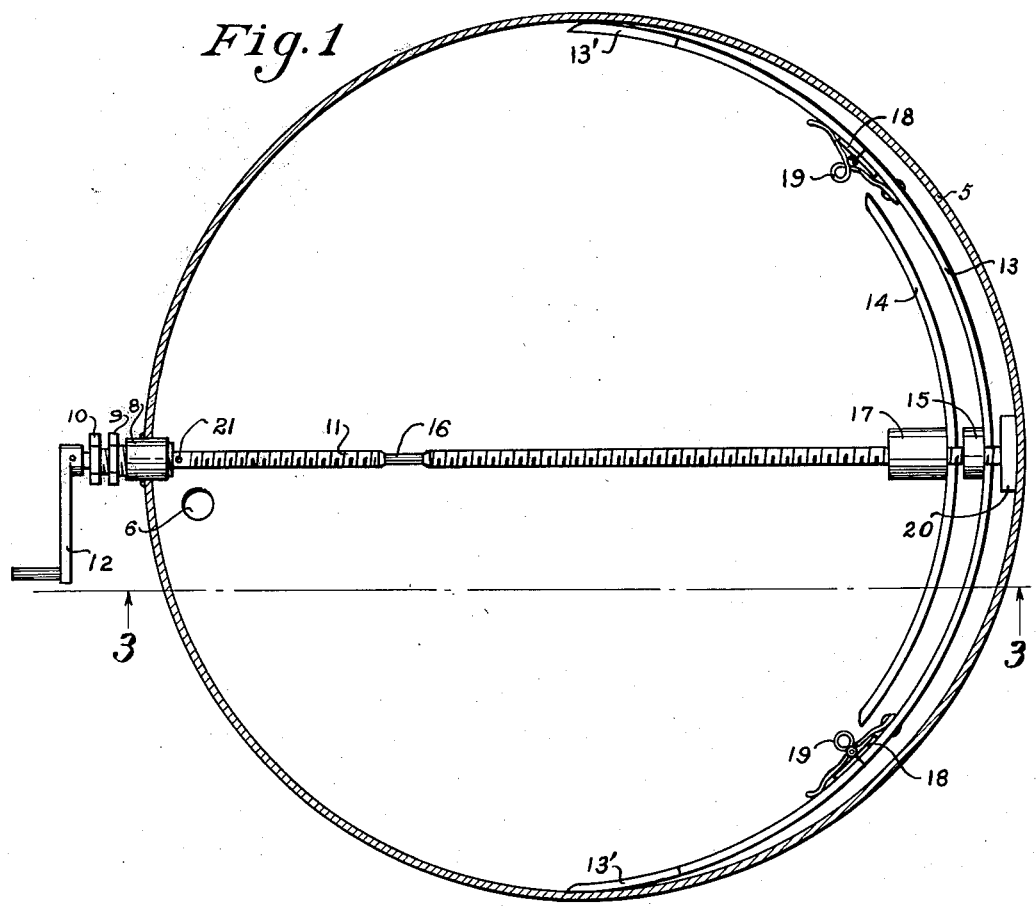
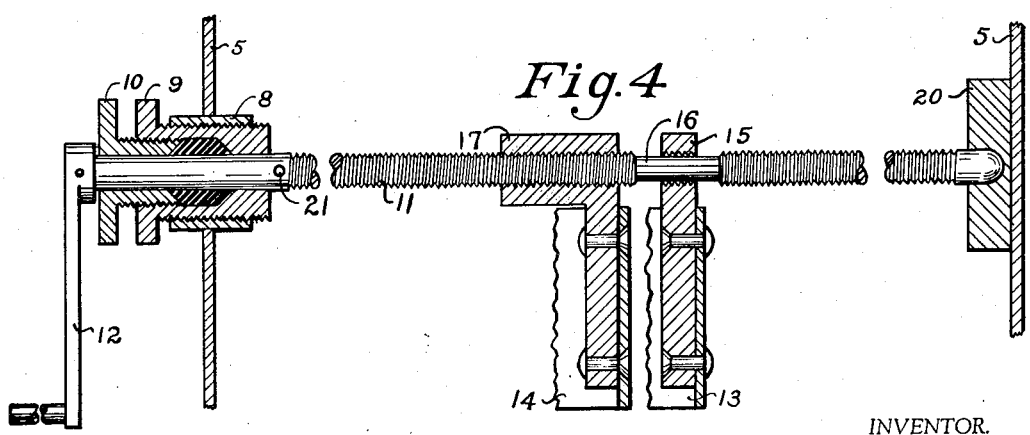
INVENTOR.
George E. Slaugenhop
BY
ATTORNEY.

March 26, 1940.    G. E. SLAUGENHOP    2,195,344
TANK CLEANER
Filed Aug. 27, 1937    2 Sheets-Sheet 2
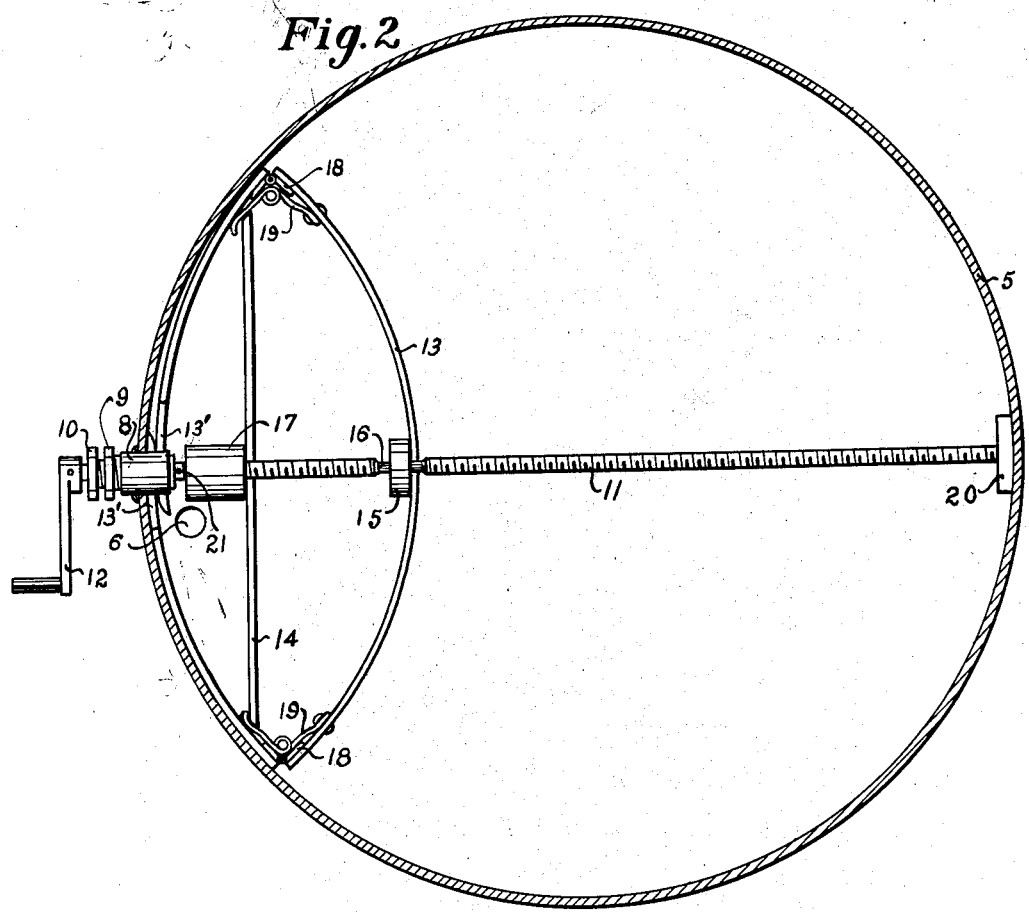
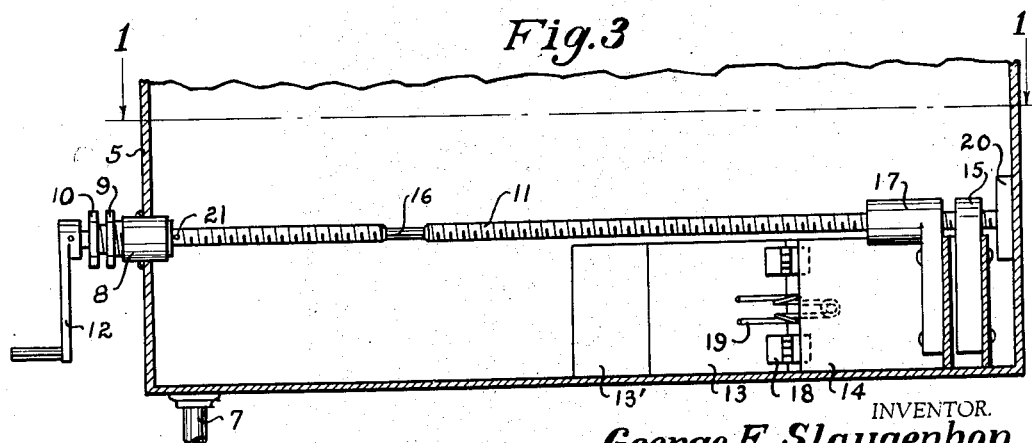
INVENTOR.
George E. Slaugenhop
BY
ATTORNEY.

Patented Mar. 26, 1940

2,195,344

UNITED STATES PATENT OFFICE 2,195,344

TANK CLEANER

George E. Slaugenhop, Vernon, Tex.

Application August 27, 1937, Serial No. 161,324

12 Claims. (Cl. 210—206)

This invention relates to a cleaner for removing the sludge and heavy precipitates from containers such as tanks used for the storage of oil.

An object of the invention is the provision of a simple and effective means, readily applicable to storage receptacles, which will remove sediment without affecting the internal pressure. The invention aims furthermore to provide for entire operation from without the container for removal of sediment from every part of the bottom of the container without agitation of the contents as a whole as is usually occasioned by the type of sediment removers used heretofore.

While the drawings illustrate a preferred embodiment of the invention, it is to be understood that in adapting the same to meet specific needs and requirements, the design may be varied and changes in the minor details of construction resorted to within the scope of the invention as claimed without departing from the spirit thereof.

In the accompanying drawings:

Fig. 1 is a horizontal section through a storage tank, on the line 1—1 of Fig. 3, showing the sediment remover applied thereto for the removal of sediment;

Fig. 2 is a similar view but showing the sediment remover in its position when the cleaning movement is completed;

Fig. 3 is a vertical section on the line 3—3 of Fig. 1, partly in elevation; and Fig. 4 is an enlarged fragmentary detail of the screw and the scraper elements.

With more detailed reference to the drawings, the numeral 5 designates a container or tank for holding oil or other liquids to be stored, the tank being provided with a sediment outlet drain 6 to which a drain pipe 7 may be connected as shown in Fig. 3.

The tank 5 is provided with a collar 8 extending through and welded in a side wall thereof, and said collar is threaded to receive a stuffing box 9. A gland 10 provides the necessary pressure for sealing the packing of said stuffing box to prevent leakage around the stem of screw 11; the stem is journaled in the stuffing box. The screw 11 extends diametrically across the lower portion of the tank 5, having a stem end extending through the stuffing box 9 with a crank 12 on the end thereof, the opposite end of said screw 11 being journaled in a plate 20 secured to the inner wall of the tank. A pin 21 prevents endwise movement of the screw 11 relative to the stuffing box 9.

The screw 11 carries scrapers 13 and 14 on longitudinally separated threaded portions of said screw having a threadless reduced portion 16 therebetween. The scraper 13 is attached to an internally threaded member 15 which, when the crank 12 is turned, will cause the threaded member 15 to travel along screw 11 until it reaches the threadless portion 16 on the screw 11. Due to the fact that this threadless portion 16 on screw member 11 is of greater length than the threaded member 15, this threaded member 15 will not pass the threadless portion 16 on the screw 11. However the scraper 14 is carried by an internally threaded member 17 which is of greater length than the threadless portion 16 on screw 11, so that said threaded member 17 will bridge the threadless portion 16 and pass thereacross between the positions shown in Figs. 1 and 2. When the threaded member 15 reaches the threadless portion 16, it cannot travel thereacross, so that its extreme forward position is that shown in Fig. 2.

The scraper 13 is provided with folding end members 13' hinged to opposite ends thereof at 18. The end members 13' are preferably relatively thin and flexible and are held in close sliding contact with the inner wall of the tank 5 by means of springs 19. This will cause the interfolding of the end members 13' upon movement of the scraper 13 to the left, as shown in Fig. 2.

The unit may be operated from externally of the tank for the removing of sediment from the inside thereof by the manipulation of crank 12. The scrapers 13 and 14 normally are in the positions shown in Fig. 1, and upon rotation of crank 12 these scrapers 13 and 14 are caused to move forwardly along a screw, thereby drawing the sediment to the drain outlet 6 where it is drained from the tank, the end members 13' folding upon such forward movement to facilitate said cleaning action.

When it is desired to return the scrapers to the positions shown in Fig. 1, the crank 12 is rotated in the reverse direction and threaded member 17 moves to a point 16 to contact threaded member 15 to move the same into threaded engagement with screw 11, causing said threaded member 15 to return to the position shown in Fig. 1, the threaded member 17 carrying the scraper 14 along with it. By this arrangement the removal of the sediment is accomplished by one movement of the scrapers across the bottom of the tank in a sure, steady manner, thereby preventing intermixing of the sediment with the contents of the tank, which would result from the use of other methods that move only a small portion of the sediment at each stroke.

The scraper 14 cleans the portion of tank between scraper 13 and drain 6; it is particularly applicable to large tanks, but may be dispensed with on smaller tanks, as the scraper 13 would clean most of the small tank bottom at one stroke.

I claim:

1. In an invention of the character specified, the combination with a cylindrical liquid container, of a screw extending transversely across the lower portion of said container, and means connected with said screw and movable across the bottom of said container approximately in contact therewith for cleaning said bottom, said cleaning means being expansible laterally of the container in accordance with variations in the width thereof at different points along the screw.

2. In an invention of the character specified, the combination with a liquid container, of a screw extending transversely across said container, and a folding scraper connected with said screw and movable across the bottom of said container.

3. In an invention of the character described, the combination with a liquid container, of a screw member extending transversely across said container, a folding scraper connected with said screw member and movable thereby across the bottom of said container, and a second scraper operatively connected with said screw member.

4. In an invention of the character specified, the combination with a liquid container, of a screw member extending transversely across said container, said screw member having a threadless portion, and a scraper having threaded engagement with said screw member and movable thereby across the bottom of said container to the threadless portion of the screw member.

5. In an invention of the character specified, the combination with a liquid container, of a screw member extending transversely across said container, said screw member having a threadless portion, and a scraper having threaded engagement with said screw member and movable thereby across the bottom of said container to the threadless portion of the screw member, said scraper having end arm extensions foldably connected therewith.

6. In a tank cleaner, the combination of a tank, a screw extending transversely across the lower portion of said tank and having longitudinally separated threaded portions, a scraper threaded on said screw and movable therealong only to the space between the threaded portions.

7. In a tank cleaner, the combination of a tank, a screw extending transversely across the lower portion of said tank and having longitudinally separated threaded portions, a scraper threaded on said screw and movable therealong only to the space between the threaded portions, and a second scraper having a supporting portion receiving the screw and of greater length than the space between the threaded portions.

8. In a tank cleaner, the combination of a tank, a screw extending transversely across the lower portion of said tank and having longitudinally separated threaded portions, a scraper threaded on said screw and movable therealong only to the space between the threaded portions, a second scraper having a supporting portion receiving the screw and of greater length than the space between the threaded portions, means journaling opposite end portions of the screw on the tank, and a handle attached to one end portion of the screw for turning the same.

9. In a tank cleaner, the combination of a tank, a screw extending transversely across the lower portion of said tank and having longitudinally separated threaded portions, a scraper threaded on said screw and movable therealong only to the space between the threaded portions, a second scraper having a supporting portion receiving the screw and of greater length than the space between the threaded portions, and end arm extensions hinged to opposite ends of the first-mentioned scraper for folding relative thereto.

10. In a tank cleaner of the character described, the combination of an upright cylindrical tank, a screw extending diametrically across the lower portion of the tank from side to side thereof, and means connected with the screw and movable thereby across the bottom of the tank substantially in contact therewith for cleaning said bottom.

11. In a tank cleaner of the character described, the combination of an upright cylindrical tank, cleaning means in the lower portion of the tank, and means mounting said cleaning means for movement diametrically across the bottom of the tank, said cleaning means being constructed for expansion laterally of the tank in accordance with variations in the width thereof at different positions of the cleaning means.

12. In a tank cleaner of the character described, the combination with a tank, of supporting means extending transversely across the tank, a scraper connected with said supporting means, means for moving said scraper bodily along said supporting means, and an end extension scraper connected with the first-mentioned scraper and movable outwardly relative thereto for lateral expansion of said first-mentioned scraper.

GEORGE E. SLAUGENHOP.